US 6,577,948 B1

(12) United States Patent
Skellenger et al.

(10) Patent No.: US 6,577,948 B1
(45) Date of Patent: Jun. 10, 2003

(54) ALGORITHM FOR DETERMINING TRAVEL DIRECTION FOR AUTOMOBILES

(75) Inventors: William J. Skellenger, Clarkston, MI (US); Christian H P Schumacher, Lake Orion, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 0 days.

(21) Appl. No.: 10/246,350

(22) Filed: Sep. 18, 2002

(51) Int. Cl.⁷ .............................................. G01C 21/26
(52) U.S. Cl. ........................... 701/207; 701/70; 701/72; 303/140; 303/146; 303/186
(58) Field of Search ............................ 701/23, 70, 72, 701/82, 84, 200, 207; 180/197; 303/140, 146, 150, 186

(56) References Cited

U.S. PATENT DOCUMENTS

| | | | | | |
|---|---|---|---|---|---|
| 5,671,143 A | * | 9/1997 | Graber | ........................ | 701/72 |
| 5,711,024 A | * | 1/1998 | Wanke | ........................ | 701/82 |
| 5,735,584 A | * | 4/1998 | Eckert | ........................ | 303/140 |

* cited by examiner

Primary Examiner—Gertrude Arthur

(57) ABSTRACT

A method of determining the direction of travel of a vehicle independent of the transmission gear position. A plurality of yaw rate values are utilized, which are summed or integrated over a period of time to generate a plurality of yaw rate sum values. The sign of each yaw rate sum value is compared. This comparison of the signs of each yaw rate sum value results in a confidence value that is used to determine the direction of travel. Preferably, the actual gear position, a calculated gear ratio, and the vehicle's velocity are used to build confidence in the resulting confidence value given above.

20 Claims, 2 Drawing Sheets

ALGORITHM FOR DETERMINING TRAVEL DIRECTION FOR AUTOMOBILES

FIELD OF THE INVENTION

The present invention relates generally to stability control systems for vehicles, and more particularly relates to the determination of a direction of travel of the vehicle.

BACKGROUND OF THE INVENTION

Some modern vehicles utilize a stability control system for controlling advance vehicle dynamics. Such stability control systems require a determination of the direction of travel for many purposes, including: 1) disabling of stability control while traveling in reverse; and 2) recognizing the steering wheel angle in a turn only when traveling forwardly. Most systems rely almost 100% on the transmission gear position given by the gear selector (PRNDL) to determine the direction of travel.

Unfortunately, the indication from the transmission gear position is not always accurate. For example, the switch utilized at the gear selector can be broken. At times, the gear selector can be between gears, and the switch will give a toggling readout that is inaccurate. Still further, the transmission gear position may be in neutral, although the vehicle may be moving forwardly or rearwardly, i.e. when the vehicle is rolling on a hill. Accordingly, there exists a need to provide a determination of the direction of travel that is less dependent upon the transmission gear position.

BRIEF SUMMARY OF THE INVENTION

The present invention provides a method of determining the direction of travel that is independent of the transmission gear position. This method allows for the rapid detection of the travel direction, even if the driver's steering wheel input is very small and the vehicle velocity is low. Furthermore, reliance on the transmission gear position is minimized, and the gear position is only used to increase the confidence of the determined direction of travel.

Generally, a plurality of yaw (turning) rate values is utilized, which are summed over a period of time. Preferably, the yaw rate values are integrated over time at discrete intervals. A plurality of yaw rate sum values are generated, and the sign of each yaw rate sum value is compared. This comparison of the signs of each yaw rate sum value results in a confidence value that is used to determine the direction of travel. Preferably, the actual gear position, a calculated gear ratio, and the vehicle's velocity are used to build confidence in the resulting confidence value.

BRIEF DESCRIPTION OF THE DRAWINGS

The accompanying drawings incorporated in and forming a part of the specification illustrate several aspects of the present invention, and together with the description serve to explain the principles of the invention. In the drawings.

Figure 1:
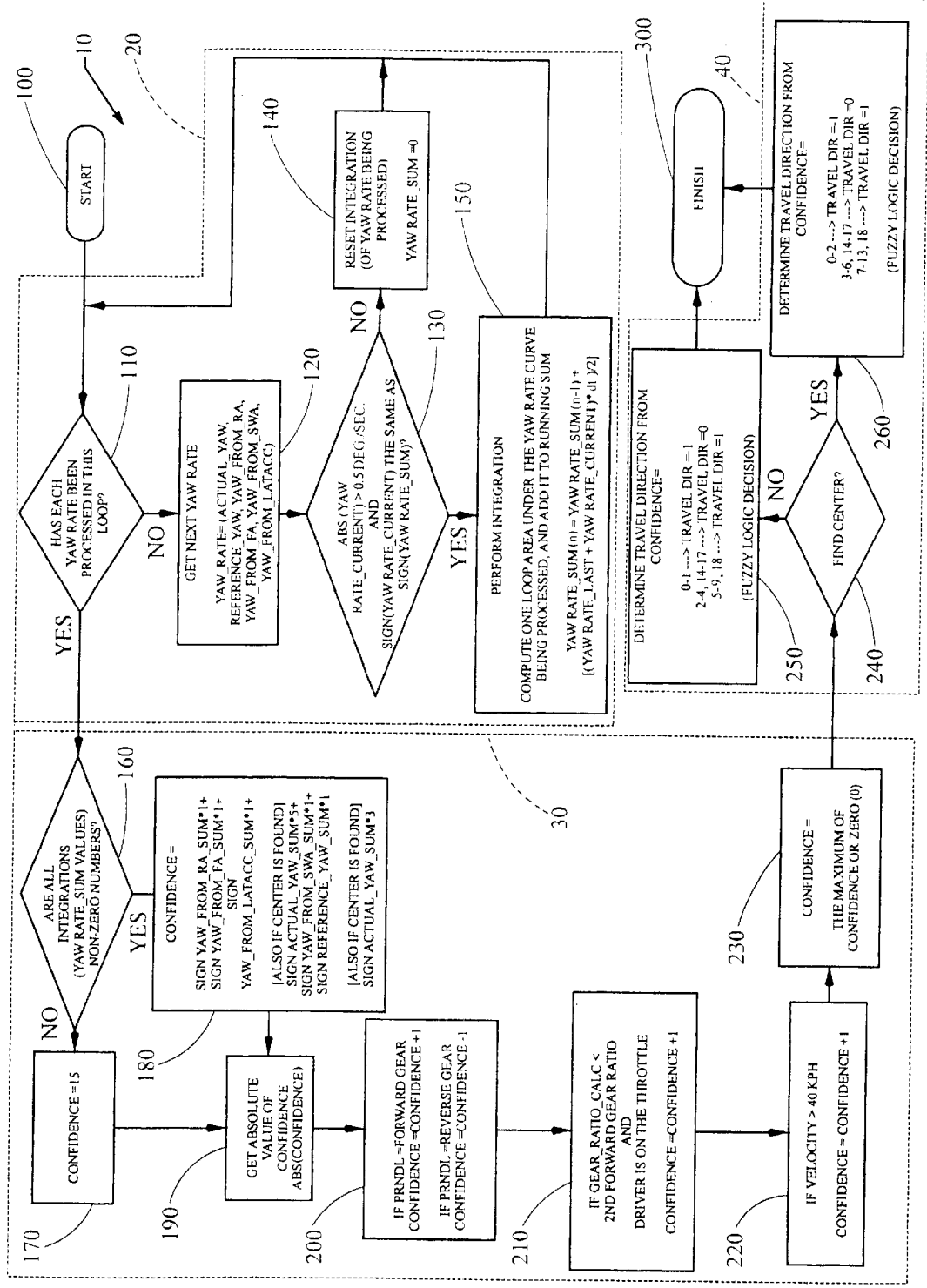
FIG. 1 is a logic flowchart depicting an embodiment of the method for determining the direction of travel constructed in accordance with the teachings of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Generally, the method of the present invention utilizes the yaw rate of a vehicle to determine its direction of travel. Briefly, yaw rate represents the rotation of the vehicle about an axis extending through its center of gravity and perpendicular to the ground. As used herein, a positive yaw rate is given when the vehicle is rotating counterclockwise (viewed from above the vehicle), or to the left. Similarly, the vehicle yaw rate has a negative value when it is rotating clockwise or to the right. As an example, when a vehicle is traveling forwardly and the steering wheel is rotated counterclockwise (to the left), the vehicle will turn to the left and the yaw rate has a positive value. However, when a vehicle is traveling rearwardly and the wheel is rotated counterclockwise (to the left), the vehicle will rotate to the right, and the yaw rate will have a negative value. It can therefore be seen that based on the direction of rotation of the steering wheel, in combination with the reading of the yaw rate, a direction of travel can be computed.

Nonetheless, the present invention provides a method for determining the direction of travel based on yaw rate, even if the direction of rotation of the steering wheel is unknown. A plurality of different yaw rate values are utilized by the present invention. More specifically, a yaw rate sensor is utilized to provide an actual yaw rate value that indicates the true rotation of the vehicle. The present invention further utilizes 3 to 5 calculated yaw rate values, which in combination with the actual yaw rate value, are used to determine the direction of travel. These calculated yaw rate values are the rear axle yaw rate, the front axle yaw rate, the lateral acceleration yaw rate, the reference yaw rate, and the steering wheel angle yaw rate.

The rear axle yaw rate is a calculation based on the left and right rear wheel speeds as measured by wheel speed "tone wheels" or shaft encoders. Generally, the left rear wheel will rotate faster than the right rear wheel when the vehicle is turning to the right, i.e. a negative yaw rate value, and vice versa. Similarly, the front axle yaw rate value is calculated based on the left and right front wheels. Again, the left front wheel will travel faster than the right front wheel when the vehicle is turning to the right, giving a negative yaw rate value. A lateral acceleration yaw rate value is calculated directly from a lateral acceleration sensor. Typically, this sensor is an accelerometer, and the lateral acceleration has a direct relationship to the yaw rate (based on vehicle speed and other constants) which can thus be computed. In addition to these yaw rate values, two additional yaw rate values can be calculated based on the steering wheel angle. A reference yaw rate value is a calculation based on the steering wheel angle and the velocity of the vehicle. The referenced yaw rate value takes into account other outside influences such as surface friction of the road and the like. Essentially, the reference yaw rate is an intended yaw rate as it is based on the vehicle velocity and the steering wheel angle. Finally, a steering wheel angle yaw rate can be computed based solely on the speed of the vehicle and the steering wheel angle. While the steering wheel angle yaw rate value is very similar to the reference yaw rate value, no outside influences are taken into account when calculating the steering wheel angle yaw rate value. While these 5 calculated yaw rate values serve many important purposes, their values can be incorrect in certain situations. More specifically, the present invention takes advantage of the fact that these calculated yaw rates are often the opposite of the actual yaw rate value when the vehicle is traveling in reverse. For example, when a vehicle is traveling forwardly and the wheel is turned to the left, the vehicle rotates to the left and the actual yaw rate of the vehicle has a positive value. Further, the right wheel of the rear axle and the right wheel of the front axle will be traveling faster than their respective left wheels, and the rear axle yaw rate will have a positive value, as will the front axle yaw rate. Similarly, the steering wheel angle yaw rate, and the reference yaw rate, which are both based on the steering wheel angle and the vehicle velocity, will also give positive values. Further, the lateral acceleration will be felt directed to the right side of the vehicle, and a positive lateral acceleration yaw rate value will be calculated. In sum, the actual yaw rate is positive, as are the five calculated yaw rates.

When the vehicle is moving rearwardly and the steering wheel is turned to the left, the vehicle will rotate to the right and the actual yaw rate value (based on the yaw rate sensor) will be a negative value. To the contrary, the readings from all of the calculated yaw rate values will be positive, as when the vehicle was traveling forwardly. That is, the right wheel of the rear axle and the right wheel of the front axle will both be traveling faster than their respective left wheels, as when traveling forwardly. Thus, the rear axle yaw rate and the front axle yaw rate will both be a positive value. Similarly, the steering wheel angle yaw rate and the reference yaw rate will both be a positive value, as the steering wheel has again been rotated to the left. Finally, the lateral acceleration will be again detected to the right of the vehicle, and the lateral acceleration yaw rate will be calculated as a positive value. Thus, all 5 of the calculated yaw rate values will be positive, even though the actual yaw rate of the vehicle is a negative value.

Accordingly, it can be seen that the 5 calculated yaw rate values have readings in opposition to the actual yaw rate value when the vehicle is traveling in reverse. As previously noted, the 5 calculated yaw rate values will be consistent with the actual yaw rate value when the vehicle is traveling forward. Based on this principle, the present invention provides a method for determining the direction of travel of the vehicle.

Turning now to the figures, a method 10 of determining the direction of travel of a vehicle is illustrated as a flow chart in FIG. 1. The method of the present invention is preferably an algorithm integrated into a stability control system of a vehicle, such as an electronic stability program (ESP). The method starts at block 100 and first flows into a calculation stage 20 which generally comprises a loop for inputting all of the yaw rate values and performing a summation of those values. Based on those calculations, the method 10 then enters a comparison stage 30 where these yaw rate sum values are compared to generate a confidence value. This value can be modified by other factors to increase the confidence of the result. Then, the method enters a determination stage 40 wherein the direction of travel is determined based on the confidence value. Finally, the method 10 finishes as indicated by block 300. The calculation stage 20 generally comprises a loop for inputting each of the yaw rate values, namely the actual yaw rate (actual_yaw), rear axle yaw rate (yaw_from_RA), front axle yaw rate (yaw_from_FA), lateral acceleration yaw rate (yaw_from_latacc), reference yaw rate (reference_yaw), and steering wheel angle yaw rate (yaw_from_SWA). From the start block 100, the method 10 flows to block 110 which represents a decision as to whether each yaw rate has been processed in this loop. As indicated by block 120, the most recent value of each yaw rate (generally referred to as yaw rate_current) is inputted.

A decision is made with regard to each of the current yaw rate values as to whether the absolute value of the particular yaw rate current is greater than 0.5° per second, as shown in block 130. This determination is made to ensure that the reading is of a true rotation of the vehicle, and not simply from simple variations from the output sensors or the respective calculations. Additionally, another condition must be satisfied as indicated by block 130, which requires that the sign (i.e. positive or negative) of the yaw rate_current is the same as the sign of the particular yaw rate sum. This is to ensure that the ongoing calculation is of a continuous yaw movement of the vehicle in one direction, and allows separate calculations for yaw movements in another time period or another direction. Thus, if a particular yaw rate_current value is not greater than 0.5 degrees per second, or if a sign of the yaw rate_current is not the same as a sign of the particular yaw rate sum, the method will flow to block 140 where the summation or integration of the particular yaw rate value being processed is reset so that its yaw rate sum is equal to zero.

If the particular yaw rate_current satisfies the conditions of block 130, the method 10 flows to block 150 representing the summation of the particular yaw rate value. While the calculation could be a simple summation of the particular yaw rate value over time, an integration is preferably performed to compute the area under the particular yaw rate curve being processed, which is added to a running sum that represents the total angular displacement. Each of the yaw rate values is inputted over time (t) at discrete intervals to give a series of yaw rate values for each of the six yaw rates. Typically, the interval of time (dt) is approximately 5 to 15 milliseconds.

Each of the yaw rate values is processed separately within the loop shown in the computation stage 20. For each yaw rate, its most recently inputted yaw rate value (yaw rate) is inputted, and an integration is performed using that value in combination with the second most recently inputted yaw rate value (yaw rate_last). Thus, the integration performs a computation of the area under the particular yaw rate curve being processed by calculating the area of the trapezoid beneath that curve, and adds the value to a running sum. Accordingly, through each loop (from 1 to n), the integration is given by the general equation:

$$\text{yaw rate sum }(n) = \text{yaw rate sum }(n-1) + ((\text{yaw rate\_last} + \text{yaw rate\_current}) \times dt)/2.$$

Here, yaw rate_current is the most recently inputted yaw rate value for the particular yaw rate being processed, and yaw rate_last is the second most recently inputted yaw rate value for the particular yaw rate being processed. It will be seen that the integration will result in a rapidly increasing yaw rate sum value for each of the particular yaw rates. Accordingly, the method can quickly detect the direction of travel, even if the steering wheel input is very small and the vehicle velocity is low. At the same time, the method 10 typically employs some type of maximum value to prevent overflow, wherein the integration will be reset at this point.

Accordingly, the method 10 will follow the loop shown in calculation stage 20 for each of the yaw rates being utilized. When each of the yaw rate_current values has been processed, the outcome of the determination in block 110 will be "yes", and the method 10 will move to the comparison stage 30 and block 160. Block 160 is a determination as to whether all of the integrations, that is all of the yaw rate sum values, are non-zero numbers. By ensuring that all of the integrations give non-zero numbers, the method 10 is ensuring that each of the yaw rates is giving some type of reading to be processed. Of course, the logic will make an exception when the steering wheel center has not been found, and ignore the reference yaw rate sum and the steering wheel angle yaw rate sum. If any of the integrations are zero, this indicates that integration is not active and the method will flow to block 170 which sets a confidence value equal to 15. The relevance of the value of 15 will be described later herein.

If the integration is active and all of the integrations are non-zero numbers, the method 10 flows to block 180 which represents the comparison of the yaw rate sum values. Specifically, the method 10 compares the sign from each of the yaw rate values. Further, the signs from each of the yaw rate values are given a weight. More specifically, the sign from the actual yaw rate value is given a weight greater than the weights of the other yaw rate values, and most preferably is of a value greater than or equal to the sums of all the other weights. In the illustrated embodiment, the sign for the actual yaw rate value is given a weight equal to the sum of the weights for the other yaw rate values. As will be described in more detail below, in certain situations only 3 of the calculated yaw rate values will be used, and the sign for each of those yaw rate values is given a weight of 1, resulting in the sign of the actual yaw rate value be given a weight of 3. In other situations, all 5 of the calculated yaw rate values will be utilized, and the signs for each of those yaw rate values will be given a weight of 1, resulting in the weight for the sign of the actual yaw rate value being 5. It will be recognized that other weighting can be used to compare the actual yaw rate to the calculated yaw rates.

In vehicle's utilizing a relative steering wheel angle sensor, as opposed to an absolute steering wheel angle sensor, the actual center position of the steering wheel is not known at vehicle start-up. Typically, the vehicle must be driving in very specific driving conditions before the relative steering wheel angle sensor can be utilized to detect the actual driving center and the actual steering wheel angle. Accordingly, when the center of the steering wheel angle has not been found, the calculated yaw rates of the reference yaw rate and the steering wheel angle yaw rate will be unavailable because they utilize the steering wheel angle in their computation. In this situation only the rear axle yaw rate, front axle yaw rate, and lateral acceleration yaw rate are utilized; their signs are given a weight of 1 and the sign of the actual yaw rate is given a weight of 3. When the steering wheel angle center is found, all 5 of the calculated yaw rate values are utilized; their signs are given a weight of 1 and the sign of the actual yaw rate value is given a weight of 5.

In sum, the process of block 180 determines a confidence value which is equal to the sum of the weighted signs of the various yaw rate sum values. Once this confidence value has been determined, the absolute value of the confidence value is determined as indicated by block 190.

The confidence value is further supplemented with additional indications of direction as shown by blocks 200, 210, and 220. As shown in block 200, if the gear transmission position is in a forward gear, the confidence value is increased by 1. If the gear transmission position is in a reverse gear, the confidence value is decreased by 1. If the transmission gear position is in neutral, the confidence value is left unchanged. As shown in block 210, if the gear ratio is less than the second forward gear ratio and the driver is on the throttle, the confidence value is further increased by 1.

As shown in block 220, if the velocity of the vehicle is greater than 40 kph, the confidence value is again increased by 1. Alternately, the confidence value is left unchanged. Finally, as indicated by block 230, if the confidence value is less than zero (i.e. a negative number) the confidence value is set to zero, as given by the equation: confidence=the maximum of (confidence or zero).

The final confidence value being reached, the method 10 then determines the direction of travel in the determination stage 40. First, the method looks to see whether or not the relative steering wheel angle sensor has found the center as indicated by block 240. If the center is not found, the direction of travel is determined from the confidence by way of a fuzzy logic decision based on certain ranges of the value of the confidence value, as indicated by block 250. Similarly, if the center is found, the method 10 utilizes a different set of values to interpret the confidence value and determine a direction of travel, as indicated by block 260. In both cases, the method flows to its end as denoted by block 300.

Figure 2:
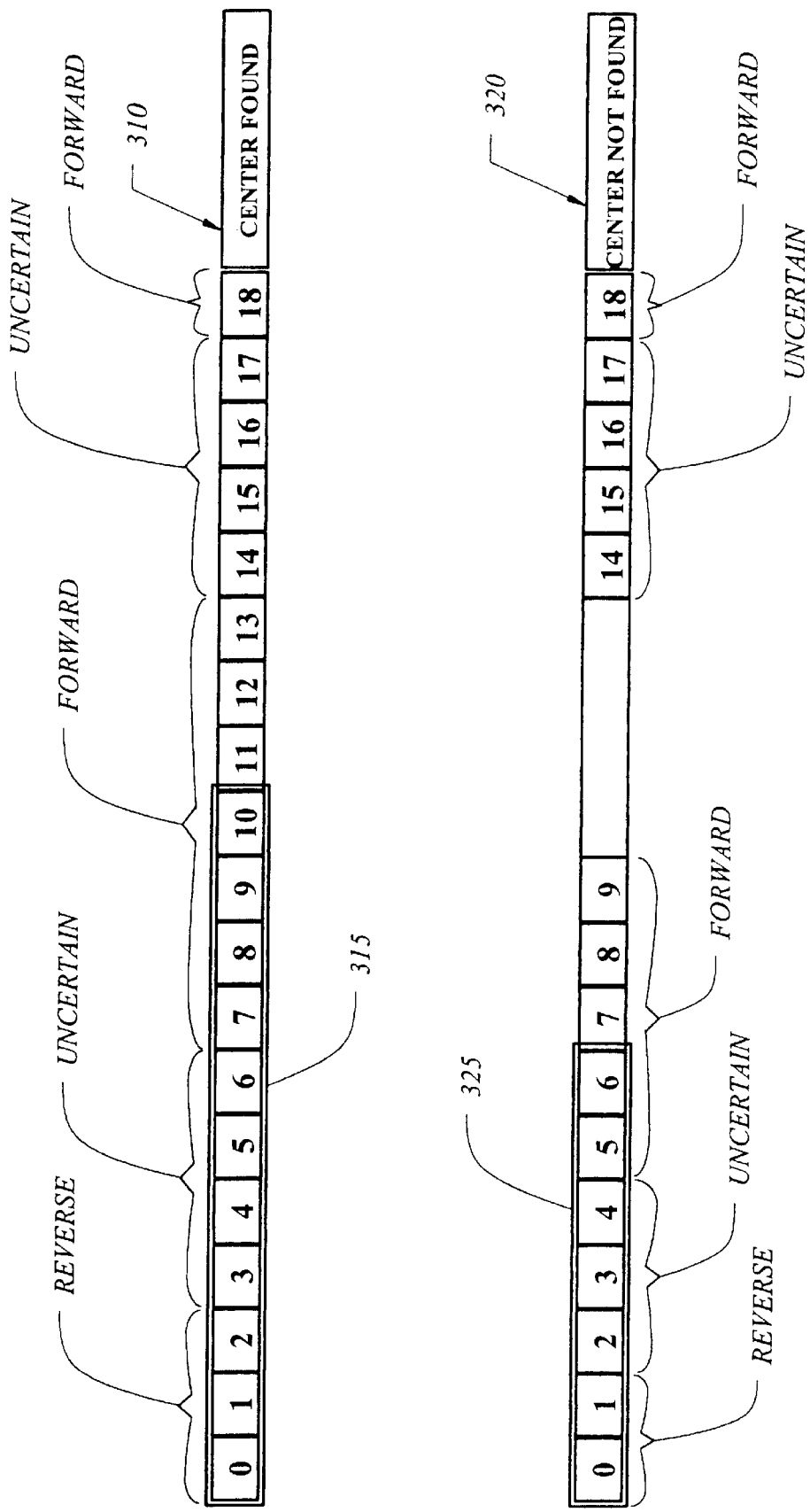
FIG. 2 is a table representing the logical determination of the direction of travel based on the method shown in FIG. 1.

The determination of the direction of travel will now be described with reference to FIG. 2. FIG. 2 shows a chart indicating the two different ranges of values utilized for determining the direction of travel, based on whether the center has or has not been found. Row 310 shows the range of confidence values which may be outputted when the steering center has been found, and the results for any particular value has been indicated by brackets. Row 320 shows a similar range of values for when the center has not been found, and these values have been indicated for their result in determining the direction of travel. In short, when the center has been found, confidence values from 0 to 2 indicate a reverse direction, from 3 to 6 and 14 to 17 indicate an uncertain result, and from 7 to 13 and 18 indicate a forward direction. When the sensor has not been found, a confidence value from 0 to 1 indicates a reverse direction, from 2 to 4 and 14 to 15 generate an uncertain result, and from 5 to 11 and 18 indicate a forward direction.

A few situations will now be described in order to better understand the method 10 of the present invention. In a situation where the steering center has been found, a vehicle is traveling forwardly and the steering wheel is turned to the left, the vehicle has a positive yaw rate. Thus, the actual yaw rate value as well as the 5 calculated yaw rate values will all return positive numbers. Accordingly, the yaw rate sum values given by the integration will rapidly increase in size as positive values. As shown in block 180, the confidence value will be given a value of 10 based on the weights given to all of the signs for the yaw rates. In a situation where the steering center is found, the vehicle is traveling forward and the steering wheel is turned to the right, all of the yaw rate values will return a negative reading. Thus, the yaw rate sum values will quickly decrease into the negative territory and the signs from each of the yaw rates will be negative. As shown in block 180, based on the weights given to each of the yaw rates, the confidence value will be −10.

In a situation where the steering center is found, the vehicle is traveling reardwardly, and the steering wheel is turned to the left, the vehicle will rotate to the right and the actual yaw rate will be negative. However, all of the calculated yaw rates will be positive, as described above. Accordingly, the signs for the actual yaw rate will be negative, and based on the weight of 5 will be given a value of −5. However, the calculated yaw rates will all be positive, and based on their weights they will add up to a positive 5. Thus, the confidence value will be equal to 0 based on block 180. Similarly, when the center is found, the vehicle is traveling reardwardly, the steering wheel is turned to the right, the actual yaw rate will be positive while the calculated yaw rates will all be negative. Again, the confidence value will be computed to be zero as the actual yaw rate counteracts the computed yaw rates, based on utilization of the sign given to the yaw rate sums and the weights given to each particular yaw rate.

Accordingly, when the vehicle is traveling in reverse and all the yaw rates are reading correctly, the confidence value will approach zero. The closer the confidence value is to zero, the more confidence there is in a reverse direction determination. When the vehicle is traveling forwardly and all of the yaw rates are correct, the confidence value approaches 10 or −10. Since the absolute value of the confidence value is taken as shown in block 190, the closer the confidence value is to 10 the more certain there is in a forward direction determination. This confidence value is then further supplemented with three other factors, namely the actual gear position, the calculated gear ratio, and the vehicle's velocity. In the situation where the block 180 had already processed a confidence value of zero, and the transmission gear position modifies the confidence value to −1, block 230 results in the confidence value being again set to zero, as this is the lowest value on the scale.

Turning again to FIG. 2, as shown in row 310 when the center is found, all of the possible outcomes from the integration and block 180 are shown by the double line 315. Similarly, in row 320 when the center is not found, all of the possible outcomes of the confidence value based on the integration is shown by the double line 325. When the confidence value approaches zero, the method 10 can be confident that the vehicle is traveling in reverse. If the confidence value is greater than 2 (and less than 7) when the center is found, and greater than 1 (and less than 5) when the center is not found, there is some uncertainty as to the direction of travel. As the confidence value approaches 10 when the center is found, and as it approaches 6 when the center is not found, the method 10 can be confident that the vehicle is traveling in a forward direction. This confidence level can be further increased by the 3 factors of transmission gear position, calculated gear ratio, and the vehicle's velocity. These factors may increase the confidence value to 11, 12, or 13 when the center is found, or to 7, 8, and 9 when the center is not found. Even if the confidence value is 7 to 9 when the center is found, or 5 when the center is not found, a forward direction is determined since some of the calculated yaw rates could be erroneous (i.e. the wheels are slipping on one side, making front axle or rear axle yaw rates incorrect).

In the situation where the integration is not performing, which is determined generally by block 160, a confidence value of 15 is assigned by block 170. At values 14 through 17, whether or not the center is found, the method 10 is uncertain of the direction of travel. Thus, without the integration, even if the transmission gear position indicates a reverse gear and the confidence level is reduced to 14, the method 10 will not output a direction of travel. Similarly, even if the transmission gear position indicates a forward gear, and the confidence level is increased to 16, the method 10 will not output a direction of travel. As can be seen, when the integration is not operating, it is only when all three of the additional factors, that is the transmission gear position, the gear ratio calculation and the driver being on the throttle, and the vehicle velocity being greater than 40 kph, does a confidence level rise to a value of 18, wherein the method 10 will output a forward direction of travel.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of determining the direction of travel of a vehicle comprising the steps of:
   inputting a plurality of yaw rate values including an actual yaw rate, a rear axle yaw rate, a front axle yaw rate, and a lateral acceleration yaw rate;
   performing a summation for each yaw rate value at discrete intervals of time to generate a plurality of yaw rate sum values including an actual yaw rate sum, a rear axle yaw rate sum, a front axle yaw rate sum, and a lateral acceleration yaw rate sum;
   comparing the sign of each yaw rate sum value and generating a confidence value based thereon; and
   determining the direction of travel based on the confidence value.

2. The method of claim 1, wherein the plurality of yaw rate values further includes a reference yaw rate and a steering wheel angle yaw rate, and wherein the plurality of yaw rate sum values includes a reference yaw rate sum and a steering wheel angle yaw rate sum.

3. The method of claim 1, wherein the step of performing a summation of each yaw rate value comprises performing an integration for each yaw rate value to generate the plurality of yaw rate sum values.

4. The method of claim 3, wherein the inputting step includes inputting the plurality of yaw rate values over time at discrete intervals (dt) to give a series of yaw rate values from 1 to n for each of the plurality of yaw rate values.

5. The method of claim 4, wherein the integration for each of the plurality of yaw rate values is given by the general equation:

$$\text{yaw rate sum }(n) = \text{yaw rate sum }(n-1) + ((\text{yaw rate\_last} + \text{yaw rate\_current}) * dt)/2,$$

where yaw rate_current is the most recently inputted yaw rate value and yaw rate_last is the second most recently inputted yaw rate value.

6. The method of claim 1, further comprising the step of determining whether each of the plurality of yaw rate sum values are non-zero numbers before performing the step of determining the confidence value.

7. The method of claim 1, wherein the step of comparing the sign of each yaw rate sum value and generating the confidence value includes providing a weight for the sign of each of the yaw rate sum values.

8. The method of claim 7, wherein the step of comparing the sign of each yaw rate sum value and generating the confidence value includes adding the weighted signs of each of the yaw rate sum values.

9. The method of claim 8, wherein the step of comparing the sign of each yaw rate sum value and generating the confidence value includes taking the absolute value of the result given by adding the weighted signs of each of the yaw rate sum values.

10. The method of claim 7, wherein the weight for the sign of the actual yaw rate sum value is greater than each of the weights for the signs of the other yaw rate sum values.

11. The method of claim 7, wherein the weight for the sign of the actual yaw rate sum value is greater than or equal to the sum of all the weights for the signs of the other yaw rate sum values.

12. The method of claim 1, further comprising the step of adjusting the confidence value based on the position of the gear selector.

13. The method of claim 12, wherein the position of the gear selector is given a positive sign for being in a forward gear, a negative sign for being in a reverse gear, and a zero sign for being in neutral, and a weight is given to the sign of the gear selector, the weight for the sign of the gear selector being less than the weight for the sign of the actual yaw rate sum value.

14. The method of claim 1, further comprising the step of adjusting the confidence value based on the gear ratio of the transmission.

15. The method of claim 1, further comprising the step of adjusting the confidence value based on a vehicle velocity being greater than a predetermined value.

16. The method of claim 1, further comprising the step of determining whether the absolute value of each yaw rate value is greater than a predetermined yaw rate value, and repeating the inputting step for a particular yaw rate value if that particular yaw rate value is less than or equal to the predetermined yaw rate value.

17. The method of claim 16, wherein the predetermined yaw rate value is approximately 0.5 degrees per second.

18. The method of claim 16, further comprising the step of resetting the summation of the particular yaw rate sum value to 0 before repeating the inputting step.

19. A method of determining the direction of travel of a vehicle comprising the steps of:

computing a yaw rate sum value for each of a plurality of yaw rate values taken over time by performing an integration for each of the plurality of yaw rate values, the plurality of yaw rate values including an actual yaw rate given by a yaw rate sensor and at least one computed yaw rate value;

comparing the yaw rate sum value for the actual yaw rate to the yaw rate sum value for the at least one computed yaw rate value; and determining a direction of travel based on the comparing step.

20. The method of claim 19, wherein the comparing step includes comparing the signs of the yaw rate sum values, the sign of the yaw rate sum for the at least one computed yaw rate value being opposite the sign of yaw rate sum for the actual yaw rate value when the vehicle is traveling in reverse, the sign of the yaw rate sum for the at least one computed yaw rate value being the same as the sign of yaw rate sum for the actual yaw rate value when the vehicle is traveling forward.

* * * * *